(12) United States Patent
Fukuda

(10) Patent No.: US 9,195,921 B2
(45) Date of Patent: Nov. 24, 2015

(54) CONTROL METHOD FOR PRINTING AND PRINTING APPARATUS

(71) Applicant: CANON KABUSHIKI KAISHA, Tokyo (JP)

(72) Inventor: Tatsuya Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/955,068

(22) Filed: Jul. 31, 2013

(65) Prior Publication Data

US 2014/0036315 A1 Feb. 6, 2014

(30) Foreign Application Priority Data

Jul. 31, 2012 (JP) .................................. 2012-169227

(51) Int. Cl.
*G06K 15/00* (2006.01)
*G06K 15/02* (2006.01)
*G06K 1/00* (2006.01)

(52) U.S. Cl.
CPC .......... *G06K 15/1867* (2013.01); *G06K 15/022* (2013.01); *G06K 15/1868* (2013.01)

(58) Field of Classification Search
CPC ...... B41J 11/0095; B41J 15/04; B41J 11/008; B41J 29/38; B41J 2/16526; G06K 15/022; G06K 15/1867; G06K 15/1868
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 4,268,943 | A | 5/1981 | Watanabe et al. |
| 4,317,270 | A | 3/1982 | Watanabe et al. |
| 5,532,799 | A | 7/1996 | Watanabe et al. |
| 5,915,146 | A | 6/1999 | Kusaka et al. |
| 6,179,287 | B1 | 1/2001 | Watanabe et al. |
| 6,240,263 | B1 | 5/2001 | Watanabe et al. |
| 6,575,546 | B2 | 6/2003 | Matsumoto et al. |
| 7,050,751 | B2 | 5/2006 | Watanabe et al. |
| 2011/0279508 | A1* | 11/2011 | Naito .............................. 347/16 |
| 2013/0088541 | A1 | 4/2013 | Naito |

FOREIGN PATENT DOCUMENTS

| JP | H03-197140 | 8/1991 |
| JP | 2002-046260 | 2/2002 |
| JP | 2003-237157 | 8/2003 |
| JP | 4278885 | 6/2009 |
| JP | 2011-240492 | 12/2011 |
| JP | 2011-240493 | 12/2011 |

* cited by examiner

*Primary Examiner* — Thierry L Pham
(74) *Attorney, Agent, or Firm* — Fitzpatrick, Cella, Harper & Scinto

(57) ABSTRACT

A control method for printing is provided which allows an image printed in an area including a unique portion on a continuous sheet to be identified as a defective image. In a case where a disabled area including the unique portion overlaps a part of a print area of an interest image being printed when the unique portion is detected, an identification mark for identifying the interest image is applied to the continuous sheet.

8 Claims, 10 Drawing Sheets

CONTROL METHOD FOR PRINTING AND PRINTING APPARATUS

BACKGROUND OF THE INVENTION

1. Field of the Invention

The present invention relates to a control method for printing and a printing apparatus in which a plurality of images is sequentially printed on a continuous sheet.

2. Description of the Related Art

Voluminous printing such as photo printing uses a rolled continuous sheet. Such a continuous sheet may include unique portions such as stains or sheet joining (splice) portions which exhibit characteristics partly different from the characteristics of the sheet. If an image is printed on such a unique portion, a user's unwanted printed matter may be output.

Japanese Patent Laid-Open No. 2002-46260 describes a printing apparatus which detects a splice portion on a sheet to determine a predetermined area on the sheet including the splice portion to be an image print disabled area and which prints an image in an area other than the image print disabled area.

Customers have recently demanded printing of images of various sizes and particularly longer images. However, the printing apparatus described in Japanese Patent Laid-Open No. 2002-46260 may unavoidably print an image in a print disabled area including a splice portion if the image to be printed is large. That is, when a detection section located on an upstream side in a sheet conveying direction detects a splice portion on the sheet, a printing section located on a downstream side in the sheet conveying direction may have already started printing an image to be printed on a print area including the print disabled area. In such a case, printing an image in the print disabled area is unavoidable, and discriminating this image from other normal images is cumbersome.

SUMMARY OF THE INVENTION

The present invention provides a control method for printing and a printing apparatus in which an image that has failed to be normally printed due to a unique portion present in a sheet can be easily determined to be defective.

In the first aspect of the present invention, there is provided a control method for printing images sequentially on a continuous sheet, the method comprising the steps of:

setting a disabled area for image printing in a case where a unique portion unsuitable for image printing that exists on the continuous sheet is detected during printing, the disabled area containing the unique portion; and applying an identification mark for identifying an interest image to the continuous sheet in a case where the disabled area overlaps a part of a print area of the interest image being printed when the unique portion is detected.

In the second aspect of the present invention, there is provided a printing apparatus comprising:

a print unit configured to sequentially print a plurality of images on a continuous sheet;

a detection unit configured to detect, during printing, a unique portion unsuitable for image printing that exists on the continuous sheet;

a setting unit configured to set, in a case where the detection unit detects the unique portion, a disabled area for image printing, the disabled area containing the unique portion; and a marking unit configured to apply, in a case where the disabled area overlaps a part of a print area of an interest image being printed when the detection unit detects the unique portion, an identification mark for identifying the interest image to the continuous sheet.

According to the present invention, in a case where an interest image being printed when a unique portion is detected is to be defective, an identification mark for identifying the interest image is applied to a continuous sheet. This allows the defective image to be easily identified. Thus, defective images can be easily distinguished from other normal images.

Further features of the present invention will become apparent from the following description of exemplary embodiments (with reference to the attached drawings).

DESCRIPTION OF THE EMBODIMENTS

First Embodiment

A printing apparatus according to the present embodiment is an example in which the present invention is applied to an ink jet printing apparatus that prints an image using an ink jet print head capable of ejecting ink. Furthermore, the printing apparatus in the present example is a high-speed line printer that uses a continuous long sheet (a sheet longer than the length of a unit (hereinafter referred to as one page or a unit image) repeatedly printed in a conveying direction) to deal with both single-sided printing and double-sided printing. The printing apparatus in the present example is particularly suitable for printing a large number of sheets in photo printing or the like.

Even if a plurality of small images, characters, or blanks is mixed in the area of one print unit (one page), everything contained in the area is collectively referred to herein as one unit image. That is, the unit image means one print unit (one page) used if images for a plurality of pages is sequentially printed on a continuous sheet. The unit image is sometimes simply referred to as an image. The length of the unit image varies depending on the size of an image to be printed. For example, the length in the sheet conveying direction is 135 mm for L-sized photographs and 297 mm for A4-sized photographs. The embodiment of the present invention is widely applicable to printing apparatuses used for a printer, a multi-function printer, a copier, a facsimile machine, and manufacturing apparatuses for various devices.

Figure 1:
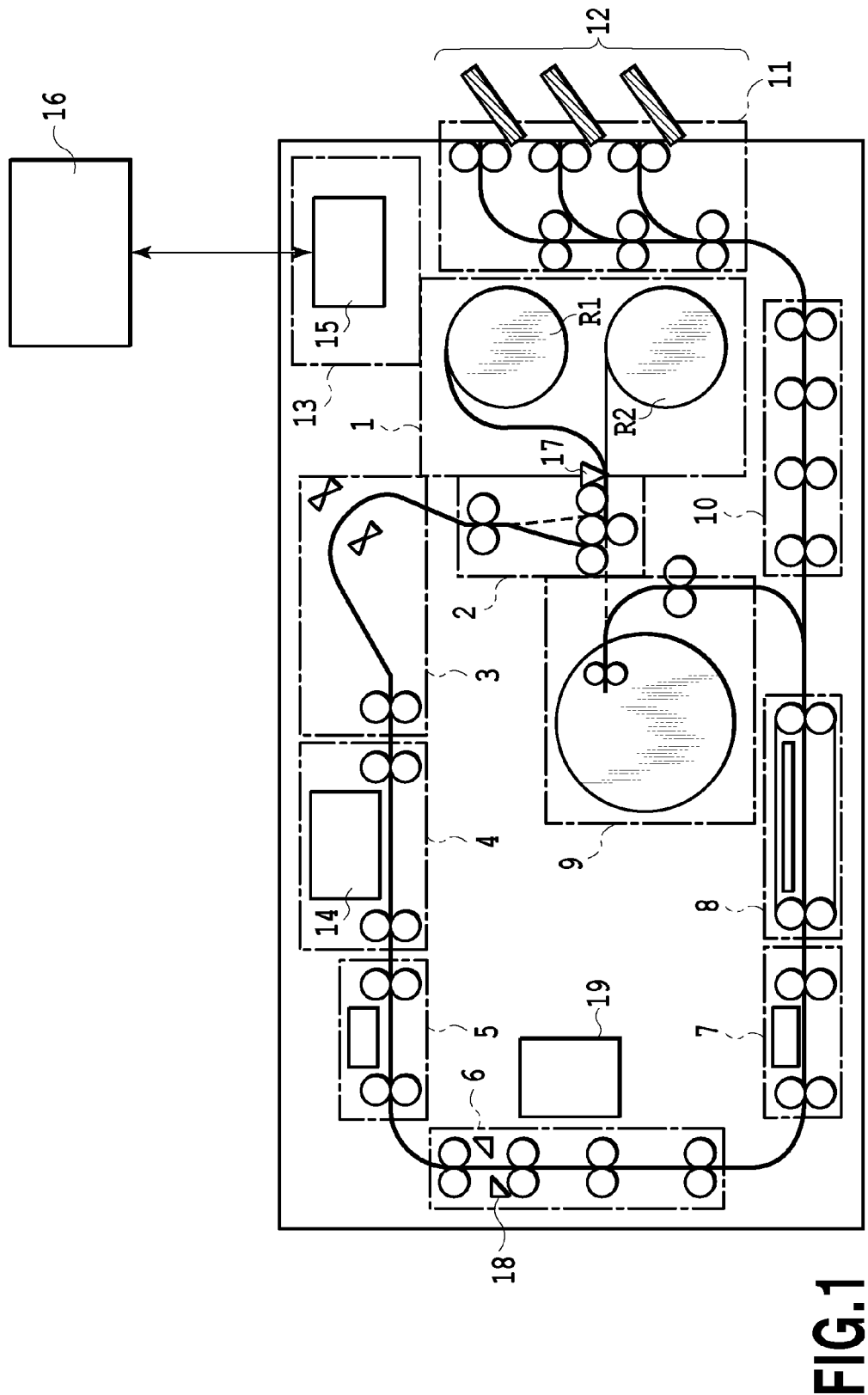
FIG. 1 is a schematic cross-sectional view of an interior of a printing apparatus according to a first embodiment of the present invention.

FIG. 1 is a schematic cross-sectional view of a printing apparatus according to the present embodiment. The printing apparatus according to the present embodiment can use a rolled sheet to print images both on a first side of the sheet (one surface) and on a second side (the other surface) located on the back of the first side. The printing apparatus contains a sheet feeding section 1, a decurl section 2, a positional-deviation correcting section 3, a printing section 4, a check section 5, a cutter section 6, an information printing section 7, a drying section 8, a reverse section 9, a discharge conveying section 10, a sorter section 11, a discharge section 12, and a control section 13. The discharge section 12 includes the sorter section 11 and carries out a discharge process. A sheet is conveyed along a sheet conveying path shown by a solid line in FIG. 1, by a conveying mechanism formed of a pair of rollers and a belt, and is processed by the units of the printing apparatus. At any position in the sheet conveying path, a side closer to the sheet feeding section 1 is referred to as an "upstream side", and the opposite side is referred to as a "downstream side".

The sheet feeding section 1 is a unit which holds a rolled continuous sheet and which draws out and feeds the sheet in a longitudinal direction thereof. The sheet feeding section 1 can house two rolls R1 and R2 and is configured to selectively draw out and feed the sheet. The sheet feeding section 1 is not limited to the capability of housing two rolls but may contain one roll or three or more rolls. Furthermore, the sheet is not limited to the rolled type and any continuous sheet may be used. For example, a continuous sheet perforated at intervals of unit lengths may be folded back at each line of perforation in a stacked manner, and the resultant sheet may be housed in the sheet feeding section 1.

If the continuous sheet used in the present example includes a unique portion such as a stain or a sheet joining (splice) portion which exhibits characteristics partly different from the characteristics of the sheet, a mark (hereinafter also referred to as a unique portion mark) M is preliminarily applied to a position corresponding to the unique portion so as to allow the unique portion to be detected. Such a unique portion on the sheet is a defective area that is inappropriate and unsuitable for image printing. A mark sensor 17 is provided near an exit of the sheet feeding section 1 to detect the unique portion mark M applied to the continuous sheet fed by the sheet feeding section 1. The unique portion on the sheet is a portion of the sheet which exhibits characteristics partly different from the characteristics of the sheet. Examples of the unique portion include not only a stain and a sheet joining (splice) portion but also a hole, a scratch, a fold, a tear, a portion mixed with foreign matter, a discolored portion, an uneven thickness portion, and a portion with dirt present therein.

The decurl section 2 is a unit that reduces possible curl (warpage) of the sheet fed by the sheet feeding section 1. The decurl section 2 reduces the curl by using two pinch rollers for one drive roller to curve the sheet so as to warp the sheet in a direction opposite to the direction of the curl, while passing the sheet between the rollers to apply a decurl force to the sheet.

The positional-deviation correcting section 3 is a unit that corrects the positional deviation (inclination to the original advancing direction) of the sheet having passed through the decurl section 2. The positional deviation of the sheet is corrected by pressing a reference end of the sheet against a guide member. The positional-deviation correcting section 3 loops the sheet being conveyed.

The printing section 4 is a sheet processing section that can print an image by carrying out a print process on the sheet from above using a print head 14. That is, the printing section 4 is a processing section that carries out a predetermined process on the sheet. The printing section 4 includes a plurality of conveying rollers configured to convey the sheet. The print head 14 is of a line type and includes ink jet nozzle lines over a range covering the maximum width of the sheet expected to be used. A plurality of the print head 14 is arranged along the conveying direction so that the print heads 14 are parallel to one another. In the present example, a total of seven print heads are provided to eject ink seven colors including C (cyan), M (magenta), Y (yellow), LC (light cyan), LM (light magenta), G (gray), and K (black). The number of ink colors and the number of print heads are not limited to 7. The ink jet scheme may use a heating element, a piezo element, an electrostatic element, or an MEMS element. The ink in each color is fed from a corresponding ink tank to the corresponding print head 14 via a corresponding ink tube.

The check section 5 is a unit that optically reads a check pattern and an image printed on the sheet by the printing section 4 using a scanner. Moreover, based on the result of the reading, the check section 5 checks the state of nozzles in the print head for ink ejection, the state of sheet conveyance, an image print position, and the like, to determine whether the image has been printed correctly. The scanner includes a CCD image sensor or a CMOS sensor.

The cutter section 6 is a unit including a mechanical cutter 18 that can cut the sheet printed with an image to a predetermined length. The cutter section 6 further includes a cut mark sensor that optically detects a cut mark printed on the sheet, and a plurality of conveying rollers configured to feed the sheet to the next step. A wastebasket 19 is provided near the cutter section 6. The wastebasket 19 accommodates small pieces of the sheet discharged as waste as a result of cutting by the cutter section 6. The cutter section 6 includes a mechanism for appropriately distribute the sheet by selectively discharging the cut sheet into the wastebasket 19 or shifting the sheet to the original conveying path.

The information printing section 7 is a unit that prints print information (specific information) such as a print serial number and a date in a non-print area on the cut sheet. The information is printed as characters, a code, or the like by an ink jet scheme or a thermal transfer scheme.

The drying section 8 is a unit that heats the sheet printed by the printing section 4 to dry the ink applied to the sheet in a short time. The drying section 8 blows hot air against the sheet passing through the drying section 8 at least from below to dry a surface of the sheet with the ink applied thereto. A drying scheme is not limited to the blowing of hot air but may involve irradiation of the sheet surface with an electromagnetic wave (ultraviolet ray or infrared ray).

The sheet conveying path from the sheet feeding section 1 to the drying section 8 is referred to as a first path. The first path has a U shape between the printing section 4 and the drying section 8. The cutter section 6 is positioned near the center of the U shape.

The reverse section 9 is a unit on which, for double-sided printing, the sheet with the front surface thereof completely printed is temporarily wound to turn the sheet upside down. The reverse section 9 is provided in the middle of a path (loop path) through which the sheet having passed through the drying section 8 is fed to the printing section 4 again. That is, the reverse section 9 is provided in the middle of a path (hereinafter referred to as a second path) from the drying unit 8 through the decurl section 2 to the printing section. The reverse section 9 includes a winding rotor (drum) that rotates to allow the sheet to be wound around the rotor. A sheet of a predetermined length which has a plurality of unit images printed on the front surface thereof and which has not been cut into the unit images is temporarily wound around the winding rotor. After the winding, the winding rotor rotates backward to feed the sheet wound around the rotor in a direction opposite to the direction in which the sheet has been wound around the rotor. The sheet is thus fed to the decurl section 2 and then to the printing section 4 again. The sheet has been turned upside down, and thus, the printing section 4 can print an image on the back surface of the sheet. If the sheet feeding section 1 is assumed to be a first sheet feeding section, the reverse section 9 may be considered to be a second sheet feeding section. A specific operation such as a double-sided printing operation will be described below.

The discharge conveying section 10 is a unit that conveys and passes the sheet cut by the cutter section 6 and dried by the drying section 8, to the sorter section 11. The discharge conveying section 10 is provided on a path (hereinafter referred to as a third path) different from the second path with the reverse section 9 provided thereon. A path switching mechanism with a movable flapper is provided at a branching position (hereinafter referred to as a "discharge branching portion") on the path to selectively guide the sheet having been conveyed through the first path, to the second path or to the third path.

The discharge section 12 including the sorter section 11 is provided at a terminal of the third path so as to be positioned on the side of the sheet feeding section 1. The sorter section 11 is a unit that sorts printed sheets into groups as necessary. The sorted sheets are discharged into a plurality of trays provided in the discharge section 12. Thus, the third path is laid out so as to extend under the sheet feeding section 1 to allow the sheet to be discharged to a side opposite to the printing section 4 and the drying section 8.

As described above, the units from the sheet feeding section 1 to the drying unit 8 are sequentially provided on the first path. A downstream path from the drying unit 8 branches into the second path and the third path. The second path joins to the first path through the reverse section 9. The discharge section 12 is provided at a terminal of the third path.

The control section 13 is a unit that controls the sections of the printing apparatus as a whole. The control section 13 includes a CPU, a storage device, a controller with various control sections, an external interface, and an operation section 15 via which a user performs I/O operations. Operation of the printing apparatus is controlled based on instructions provided via the external interface by the controller or a host apparatus 16 such as a host computer which is connected to the controller.

Figure 2:
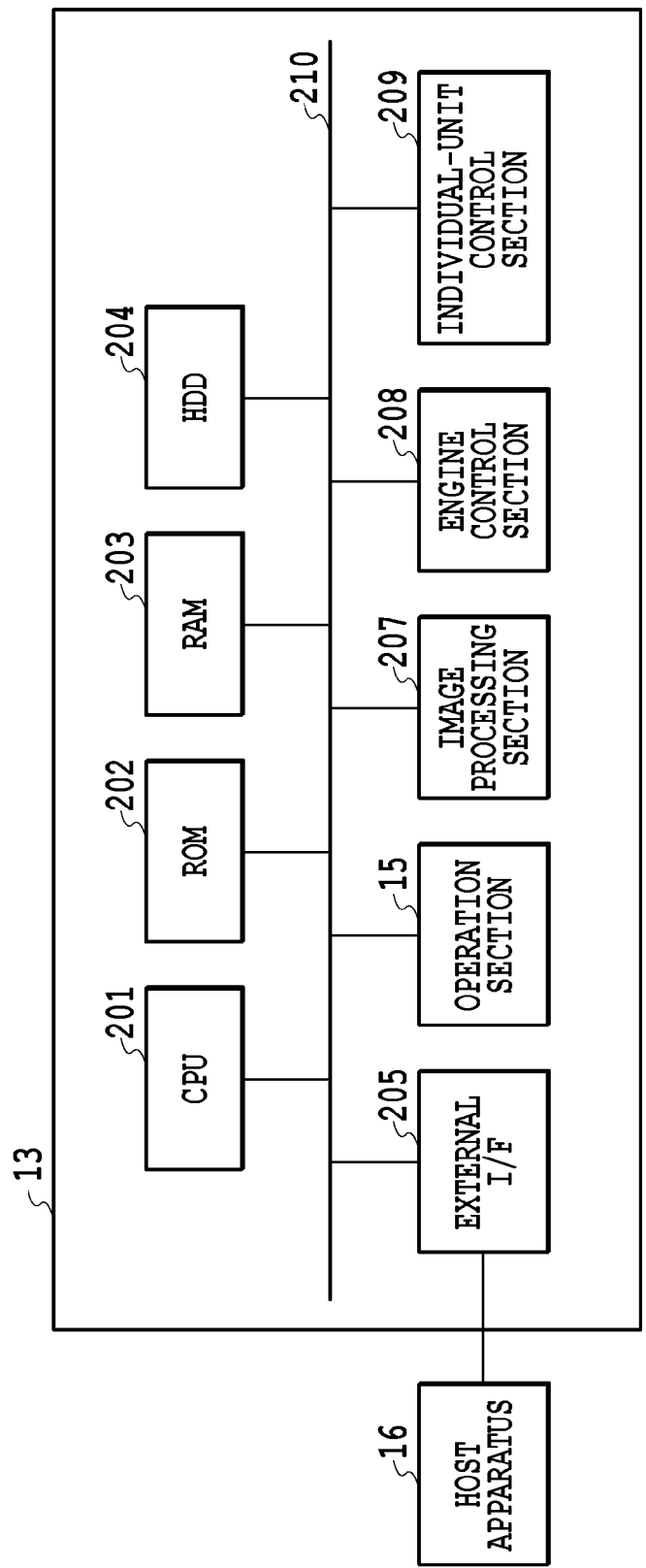
FIG. 2 is a block diagram of a control section.

FIG. 2 is a block diagram schematically showing a configuration of the control section 13. The controller included in the control section 13 has a CPU 201, a ROM 202, a RAM 203, an HDD 204, an image processing section 207, an engine control section 208, and an individual-unit control section 209. The CPU 201 (Central Processing Unit) integrally controls operation of each unit of the printing apparatus. The ROM 202 stores programs executed by the CPU 201 and stored data needed for various operations of the printing apparatus. The RAM 203 is used as a work area for the CPU 201 or a temporary storage area for various receive data or to store various setting data. The HDD 204 (hard disk) can store and read programs executed by the CPU 201, print data, and setting data needed for various operations of the printing apparatus. The operation section 15 is an I/O interface with the user and includes an input section such as hard keys or a touch panel and an output section such as a display that presents information or a voice generator.

Units needing high-speed data processing include a dedicated processing section. The image processing section 207 carries out image processing on print data used for the printing apparatus. A color space (for example, YCbCr) for input image data is converted into a standard RGB color space (for example, sRGB). Furthermore, various types of image processing such as resolution conversion, image analysis, and image correction are carried out on the image data as necessary. Print data resulting from these types of image processing is stored in the RAM 203 or the HDD 204. The engine control section 208 controllably drives the print head 14 of the printing section 4 in accordance with the print data based on control commands received from the CPU 201 or the like. The engine control section 208 further controls a conveying mechanism for each section in the printing apparatus. The individual-unit control section 209 is a sub-controller that individually controls the units including the sheet feeding section 1, the decurl section 2, the positional-deviation correcting section 3, the check section 5, the cutter section 6, the information printing section 7, the drying section 8, the reverse section 9, the discharge conveying section 10, the sorter section 11, and the discharge section 12. Based on instructions from the CPU 201, the individual-unit control section 209 controls the operations of the respective units. The external interface 205 is an interface (I/F) configured to connect the controller to the host apparatus 16. The external interface 205 is a local I/F or a network I/F. The above-described components are connected together by a system bus 210.

The host apparatus 16 serves as a supply source configured to supply image data to the printing apparatus. The host apparatus 16 may be a general-purpose or dedicated computer or a desiccated image device such as an image capture, a digital camera, or a photo storage which has an image reader section. If the host apparatus 16 is a computer, then an OS, application software for generating image, and a printer driver for the printing apparatus are installed in a storage apparatus included in the computer. Not all of the above-described processing needs to be implemented by software, and part or all of the processing may be implemented by hardware.

Now, a basic operation during printing will be described. The print operation varies between a single-sided print mode and a double-sided print mode, and will thus be described in connection with each of the modes.

In the single-sided print mode, the printing section 4 prints an image on the front surface (first surface) of the sheet fed from the sheet feeding section 1 and processed by the decurl section 2 and the positional-deviation correcting section 3. Images each of a predetermined unit length in the conveying direction (unit images) are sequentially printed on a long continuous sheet. The plurality of images is arranged in the sheet conveying direction. The sheet printed with the images passes through the check section 5 and is sequentially cut into a unit image by the cutter section 6. The information printing section 7 prints information on the back surface of each cut sheet as necessary. Each cut sheet is conveyed to the drying section 8. The cut sheet passes through the discharge conveying section 10 and is subsequently sequentially discharged and loaded into the discharge section 12 of the sorter section 11. The sheet remaining on the printing section 4 side after the final cut sheet is obtained by cutting is fed back to the sheet feeding section 1 and wound into a roll R1 or R2. Thus, in the single-sided printing, the sheet is processed while passing through the first path and the third path, and avoids passing through the second path.

On the other hand, in the double-print mode, a front-surface (first-side) print sequence is followed by a back-surface (second-side) print sequence. The operation from the sheet feeding section 1 to the check section 5 is the same as the single-side printing operation. In the front-surface print sequence, the cutter section 6 avoids performing a cutting operation, and the continuous sheet is conveyed to the drying section 8 without being processed. The drying section 8 dries the ink on the front surface of the sheet. The sheet is not guided to the path on the discharge conveying section 10 side (third path) but to the path on the reverse section 9 side (second path). On the second path, the sheet is wound around the winding rotor of the reverse section 9 rotating forward (counterclockwise in FIG. 1). In the printing section 4, when all of the images scheduled to be printed are printed on the front surface of the continuous sheet, the continuous sheet is cut at a trail end of a print area by the cutter section 6. A portion of the continuous sheet located downstream of the cut position in the conveying direction, that is, the printed portion of the continuous sheet printed with the images and cut at the trail end thereof, passes through the drying section 8. The sheet is then completely wound around the reverse section 9 up to the trail end thereof (cut position). Simultaneously with the winding around the reverse section 9, an unprinted portion of the continuous sheet which remains upstream of the cut position (on the printing section 4 side) in the conveying direction is fed back to the sheet feeding section 1 so as to prevent the leading end of this portion from remaining in the decurl section 2, and is then wound into the roll R1 or R2. The back-feeding of the unprinted portion of the continuous sheet allows the unprinted portion from colliding against the printed portion of the continuous sheet fed again during the back-surface print sequence described below.

The front-surface print sequence is followed by the execution of the back-surface print sequence. First, the winding rotor of the reverse section 9 rotates in a direction (clockwise direction in FIG. 1) opposite to the direction in which the winding rotor rotates during the winding operation, to feed the continuous sheet that has been printed when the sheet is wound around the winding rotor. The trail end of the continuous sheet that has been printed when the sheet is wound around the winding rotor serves as a leading end during feeding and is fed along a path shown by a dashed lie in FIG. 1, into the decurl section 2. The decurl section 2 corrects possible curl applied to the continuous sheet in the winding rotor. The decurl section 2 is positioned between the sheet feeding section 1 and the printing section 4 on the first path and between the reverse section 9 and the printing section 4 on the second path. The decurl section 2 functions as a common unit performing a decurl operation on both paths. The printed continuous sheet turned upside down is fed through the positional-deviation correcting section 3 to the printing section 4, which prints an image on the back surface of the continuous sheet. Subsequently, the continuous sheet passes through the check section 5 and is sequentially cut into a preset predetermined unit length by the cutter section 6. The cut sheet of the predetermined unit length has been printed on the opposite sides thereof, and thus, the information printing section 7 prints no information on the cut sheets. The resultant cut sheets are conveyed one by one to the drying section 8 and sequentially discharged into the discharge section 12 of the sorter section 11 via the discharge conveying section 10. Thus, during the double-sided printing, the sheet is processed by passing through the first path, the second path, the first path, and the third path in this order.

Now, an operational sequence carried out in accordance with a print schedule in the single-sided print mode will be described in detail. In the printing apparatus according to the present embodiment, the mark sensor (mark detection section) 17 serving as an optical sensor is provided on the sheet feeding section 1 side to detect a unique portion mark M printed on the front surface of the sheet.

Figure 3:
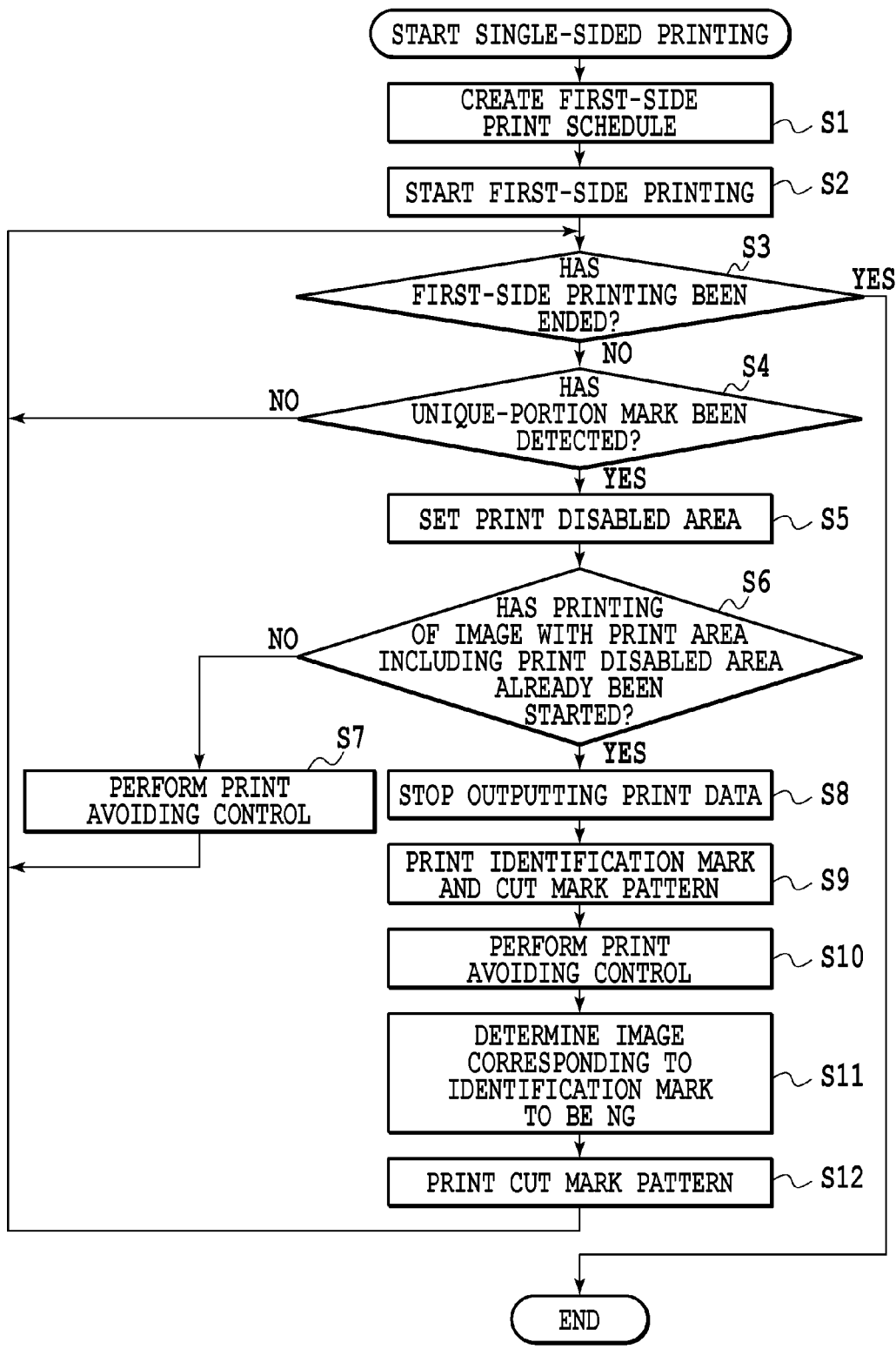
FIG. 3 is a flowchart illustrating a single-sided print operation.

FIG. 3 is a flowchart illustrating a general sequence of a print operation controlled by the control section.

First, in step S1, a first-side print schedule is created based on a print instruction. The first-side print schedule is data specifying the order of the positions of a plurality of unit images sequentially printed on the first side of the continuous sheet, the position of a cut mark formed in a marginal area between adjacent unit images, the position of preliminary ejection, the position of an ejection failure monitoring pattern, the position of the marginal area, and the like. The cut mark is provided to indicate a position where the continuous sheet is cut. The preliminary ejection is an operation of ejecting ink that does not contribute to image printing, in order to maintain the appropriate ink ejection status of the print head. Preliminarily ejected ink impacts the continuous sheet at a preliminary ejection position. The ejection failure monitoring pattern is printed on the continuous sheet with ink ejected through nozzles in the print head, in order to monitor the ejection status of the nozzles. The ink ejection status of the nozzles can be monitored by detecting the result of printing of the ejection failure monitoring pattern visually or by a sensor. The pattern formed on the continuous sheet with the preliminarily ejected ink, the ejection failure monitoring pattern, and the cut mark pattern are collectively referred to as maintenance patterns.

Figure 4:
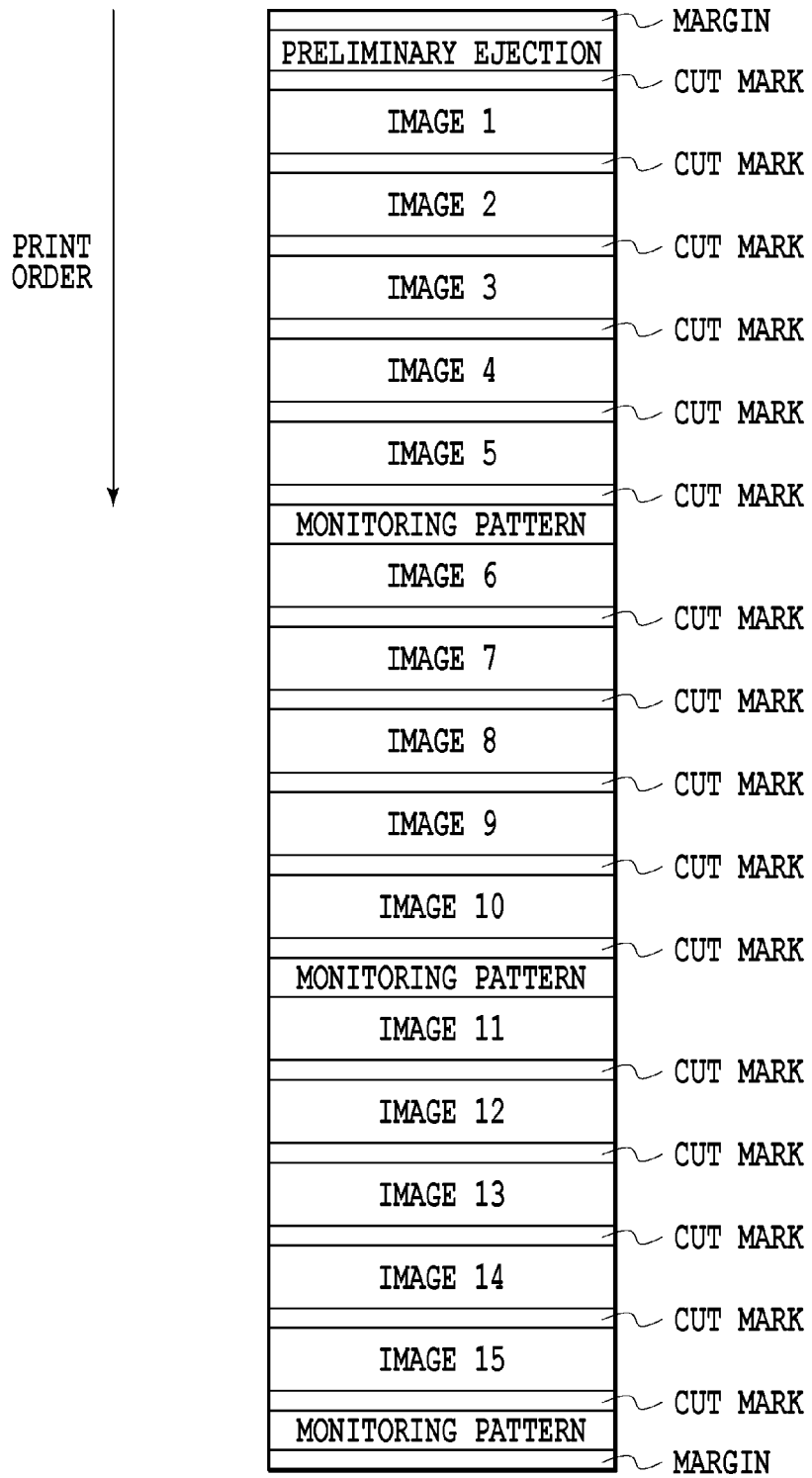
FIG. 4 is a diagram illustrating a basic first-side print schedule.

In the present example, a basic first-side print schedule is created as shown in FIG. 4. In FIG. 4, "image 1", an "image 2", "image 3", . . . are indicative of the print positions of the unit images, "margin" is indicative of the position of the marginal area, and "cut mark" is indicative of the print position of the cut mark. Furthermore, "preliminary ejection" is indicative of the position to which the preliminarily ejected ink is attached, and "monitoring pattern" is indicative of the print position of the ejection failure monitoring pattern. In the first-side print schedule in the present example, the position of preliminary ejection is set at the leading portion (the top portion of FIG. 4) of the sheet, and the print position of the ejection failure monitoring pattern is set at predetermined regular intervals and after the last printed image.

In step S2, in accordance with the thus created basic first-side print schedule, the unit images and the maintenance patterns are sequentially printed on the continuous sheet in the predetermined order. In step 3, it is determined whether or not the first-side print specified by the first-side print schedule has all been finished. If all of the first-side print has been finished, the present sequence ends. If not all of the first-side print has been finished, the process shifts to step S4.

In step S4, it is determined whether or not the unique portion mark M preliminarily applied to the position corresponding to a unique portion on the continuous sheet has been detected by the mark sensor 17. If the unique portion mark M is detected, the process shifts to step S5. If the unique portion mark M is not detected, the process returns to step S3 to repeat a print process.

Figure 5:
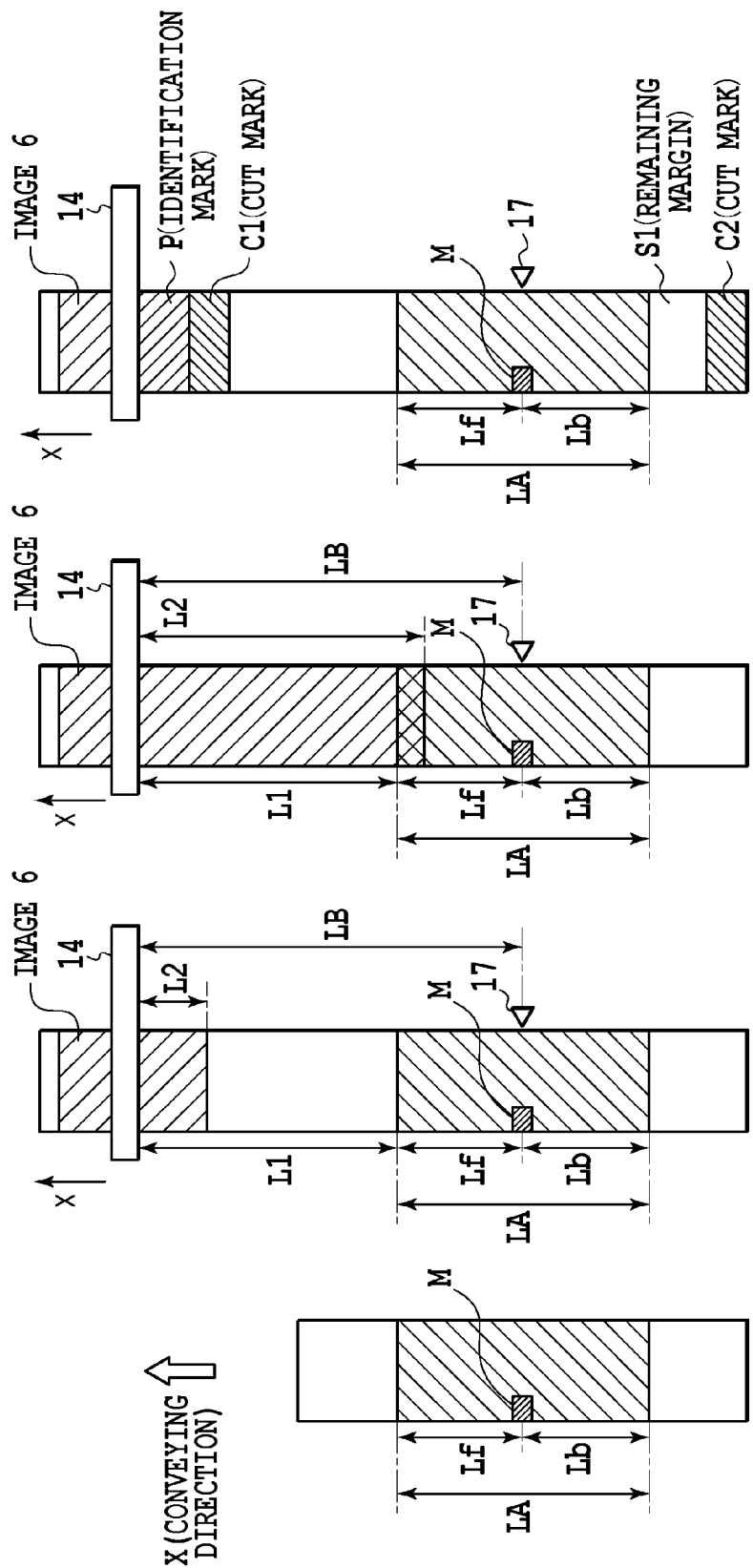
FIGS. 5A, 5B, 5C, and 5D are diagrams illustrating different relations between a print disabled area and an image.

In step S5, a predetermined range including the unique portion is set to be a print disabled area LA based on the position where the unique portion mark M has been detected. In the present example, the print disabled area LA includes a front print disabled area Lf and a back print disabled area Lb as shown in FIG. 5A. The front print disabled area Lf extends a predetermined distance Lf from the unique portion mark M in a conveying direction X. The back print disabled area Lb extends a predetermined distance Lb from the unique portion mark M in a direction opposite to the conveying direction X.

In the next step S6, a length L1 and a length L2 are compared with each other to determine whether or not printing of an image (interest image) with a print area including the print disabled area LA has already been started. This is carried out as follows. As shown in FIG. 5B, the distance from the mark sensor 17 to the print position of the print head 14 is defined as LB, and the length L1 (=LB−Lf) of the continuous sheet from the print position of the print head 14 to the front print disabled area Lf is determined. Furthermore, the remaining print length L2 of an image 6 being printed is determined. The length L1 and the length L2 are compared with each other to determine whether or not printing of the image with a print area including the print disabled area LA has already been started.

The process thus determines whether or not printing of such an image as has a print area covering the print disabled area LA has already been started. In other words, the process determines whether or not, when a unique portion is detected, the print disabled area LA overlaps a part (on the trail end side) of the print area in which the interest image being printed is to be printed. For example, if L1 is longer than L2 as shown in FIG. 5B, the image 6 being printed does not include the print disabled area LA as a print area. In this case, the process determines that printing of the image with a print area including the print disabled area LA has not been started. On the other hand, if L2 is longer than L1 as shown in FIG. 5C, the image 6 being printed includes the print disabled area LA as a print area. In this case, the process determines that printing of the image with a print area including the print disabled area LA has already been started.

In such a determination process, the CPU 201 functions as a determination section that determines whether or not printing of the interest image has already been started when the unique portion mark M is detected.

Figure 6:
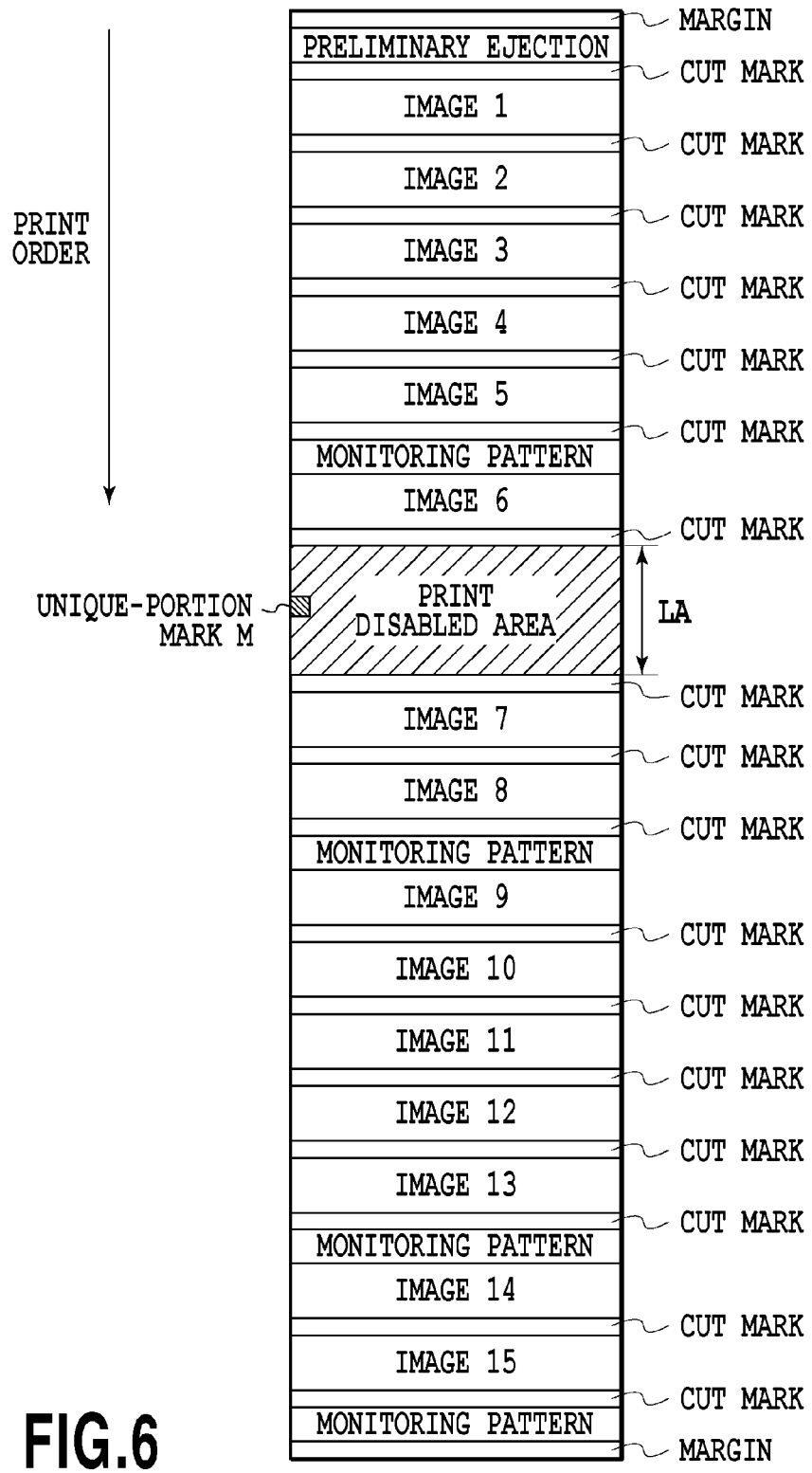
FIG. 6 is a diagram illustrating a first variation of the first-side print schedule.

In step S6 as described above, upon determining that printing of the image with a print area including the print disabled area LA has not been started, the process shifts to the next step S7. In step S7, control (also referred to as print avoiding control) for avoiding the printing of an image in the print disabled area LA is performed to change the basic first-side print schedule in FIG. 4 as shown in FIG. 6. The first-side print schedule in FIG. 6 is also referred to as a first variation of the first-side print schedule. The first-side print schedules in FIG. 5A, FIG. 5B, and FIG. 5C interpose the print disabled area LA between the image 6 being printed and the next image 7. Thus, the print head 14 prints the images so as to avoid the print disabled area LA. While the print disabled area LA is passing through the print head 14, such print avoiding control is performed and then the process returns to step S3 described above.

In the above-described step S6, upon determining that printing of the image with a print area including the print disabled area LA has already been started, the process immediately stops outputting print data for the image (interest image) 6 being printed.

In the next step S9, an identification mark P and a pattern of a cut mark C1 are generated, the identification mark P indicating that the image 6 has a print area including the print disabled area LA and is thus defective, and the identification mark P and the cut mark C1 are printed on the sheet. The identification mark P determines the interest image to be defective. The identification mark P and the cut mark C1 are printed in the rear of the image 6, for which printing has been stopped, as shown in FIG. 5D. The print head 14 functions as a mark applying section that applies the identification mark P, serving as an identification mark, to the sheet. Such a mark applying section is not limited to the configuration using the print head 14 but may be any configuration capable of applying an identification mark to the sheet. For example, the mark applying section may be configured separately from the print head 14.

Figure 7:
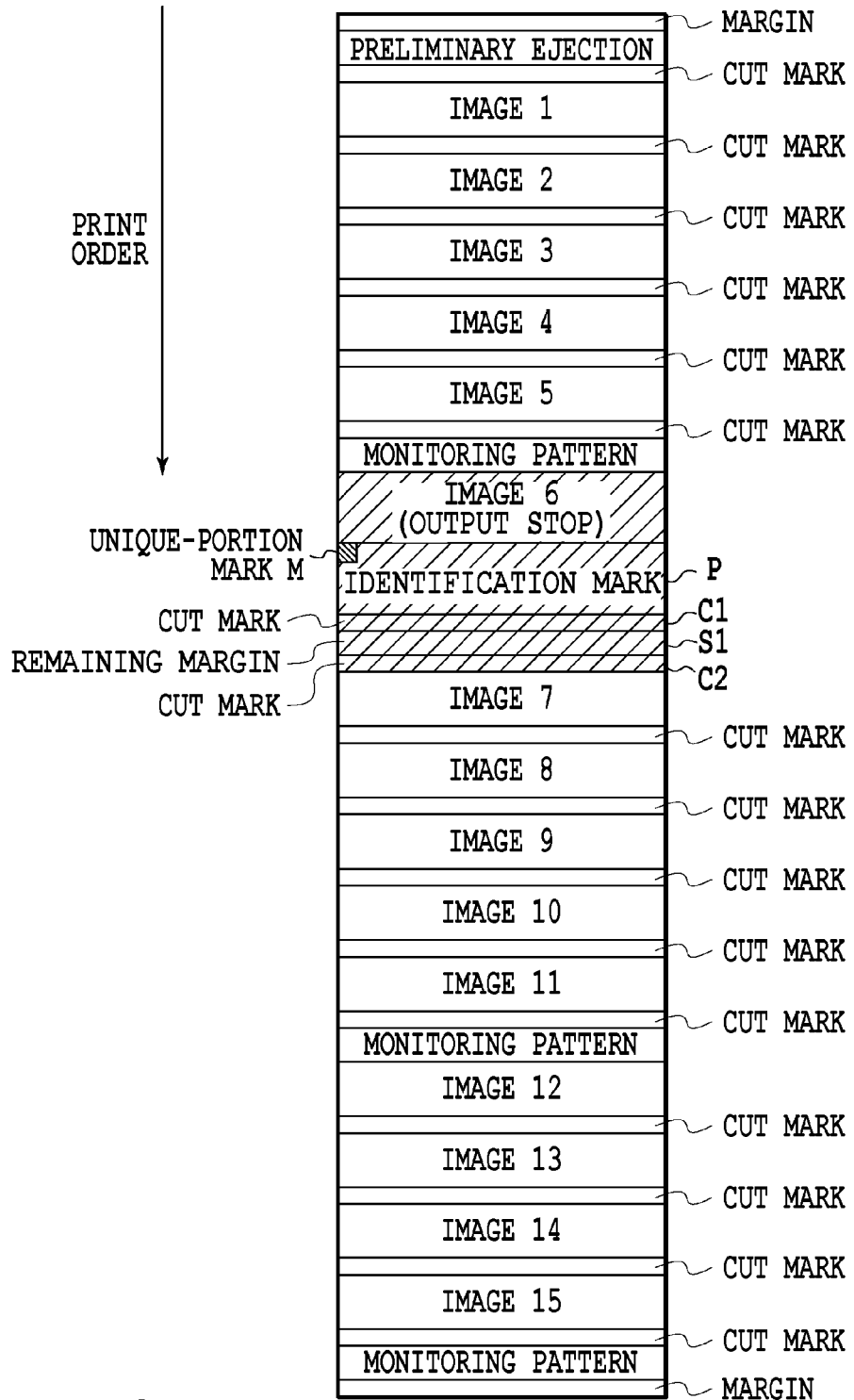
FIG. 7 is a diagram illustrating a second variation of the first-side print schedule.

Such processing in steps S8 and S9 is carried out in accordance with the first-side print schedule changed as shown in FIG. 7. This schedule is obtained by changing the basic first-side print schedule in FIG. 4 and is also referred to as a second variation of the first-side print schedule. The first-side print schedule in FIG. 7 interposes the identification mark P, the cut mark C1, a remaining margin S1, and a cut mark C2 between the image 6, for which the output of print data has been stopped, and the next image 7.

In step S10, the print avoiding control is performed to avoid printing an image in the remaining margin S1. Thus, the print head 14 prints the image so as to avoid the remaining margin S1.

In the next step S11, the identification mark P printed in step S9 is detected by the check section 5. If the identification mark P is detected, the process determines that the result of printing of the image 6 preceding the pattern P is defective (NG). The result of the determination can be communicated or printed. In the next step S12, a pattern of the cut mark C2 is generated and printed. Then, the process returns to the above-described step S3 to continue printing images because printing of the images other than the image 6 poses no problem.

Subsequently, the continuous sheet is cut at the portion corresponding to the cut mark by the cutter section 6. The defective image 6 with a defective print result may be printed again after one or more images to be subsequently printed or printed first after the print disabled area LA has passed.

Thus, the present embodiment determines whether or not, if the unique portion mark M is detected in the single-sided print mode, printing of an image with a print area including the print disabled area has already been started, and changes the print schedule according to the result of the determination. If printing of the image with a print area including the print disabled area has already been started, the identification mark indicating that the image is defective is printed on the sheet. Thus, if the image to be printed contains an image of a different length or the image to be printed is long, printing can be continued with the defective image recognized.

Second Embodiment

Figure 8:
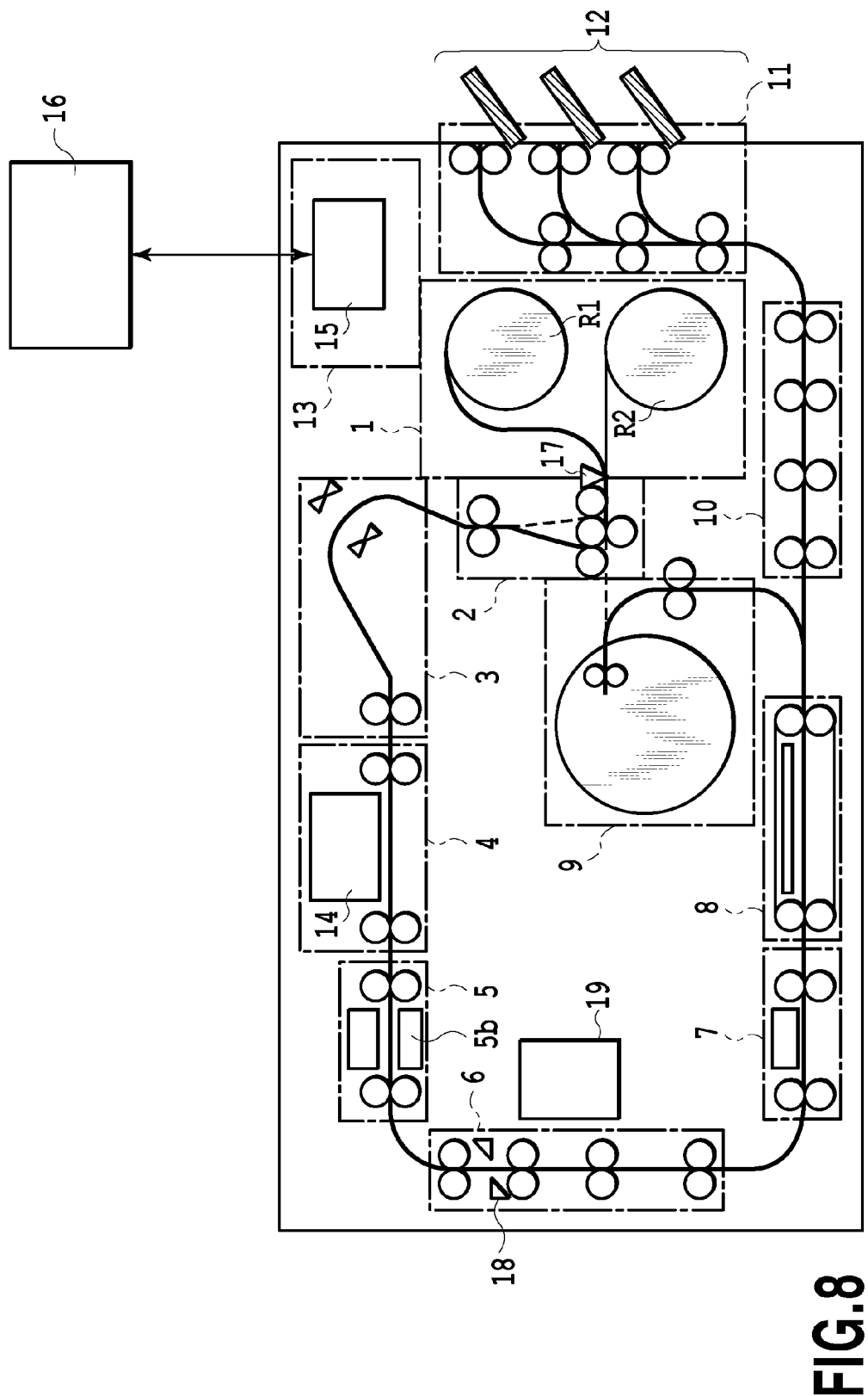
FIG. 8 is a schematic cross-sectional view of an interior of a printing apparatus according to a second embodiment of the present invention.

According to the present embodiment, the check section 5 of the printing apparatus in FIG. 1 further includes a scanner 5b for checking the back surface of the continuous sheet as shown in FIG. 8. The remaining part of the configuration of the printing apparatus according to the present embodiment is similar to that of the printing apparatus according to the first embodiment and will thus not be described. In the double-sided print mode, printing of the front surface (first side) of the continuous sheet is performed in accordance with the front-surface print sequence according to the above-described embodiment. A sheet of a predetermine length which has not been cut into image units is wound around the winding rotor of the reverse section 9. The front-surface print sequence is followed by the start of the back-surface (second-side) print sequence in the double-sided print mode.

Figure 9:
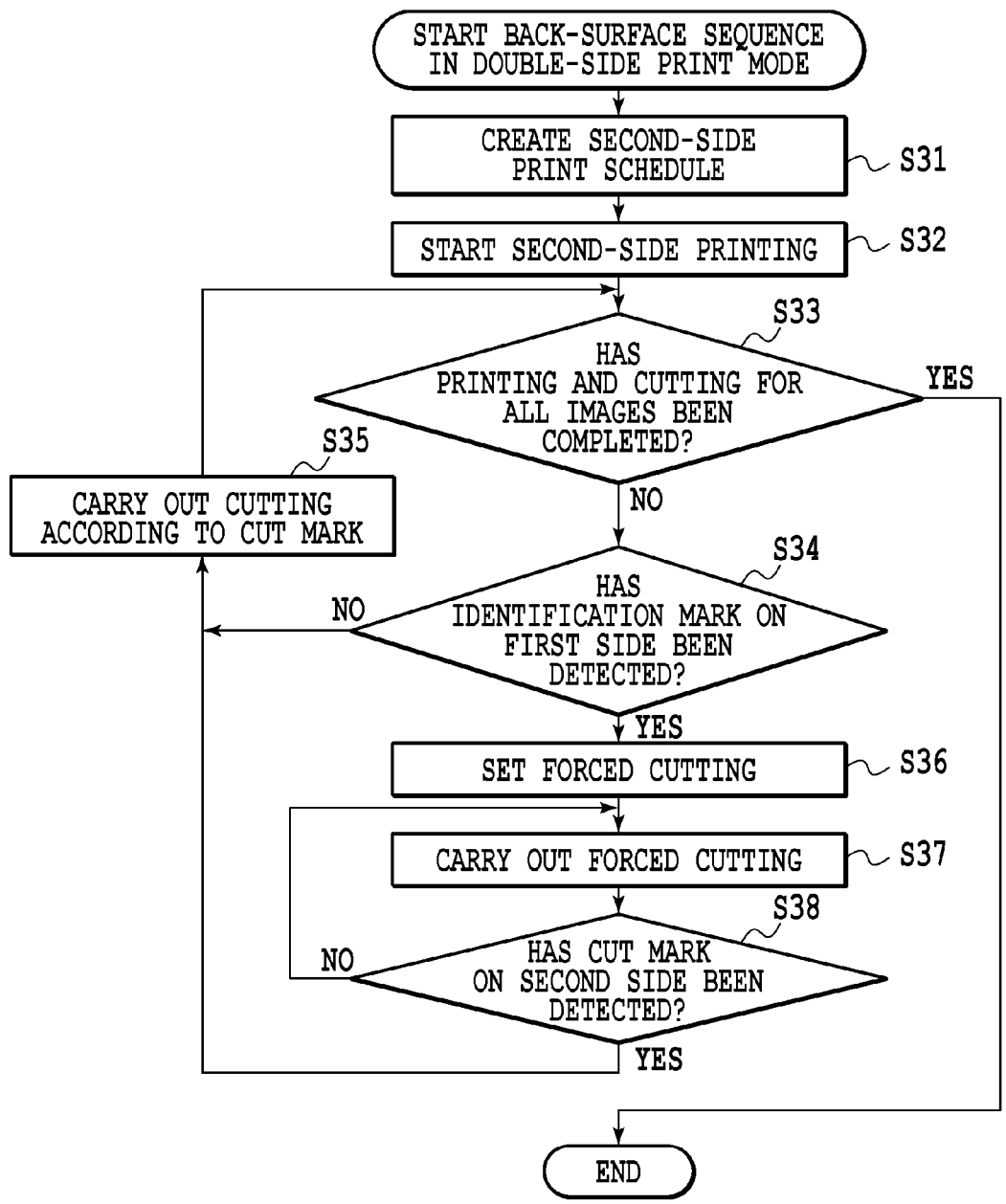
FIG. 9 is a flowchart illustrating a back-surface print operation.

FIG. 9 is a flowchart illustrating the back-surface print sequence in the double-sided print mode. The back-surface (second-side) print sequence is controlled by the control section 13 of the printing apparatus.

Figure 10:
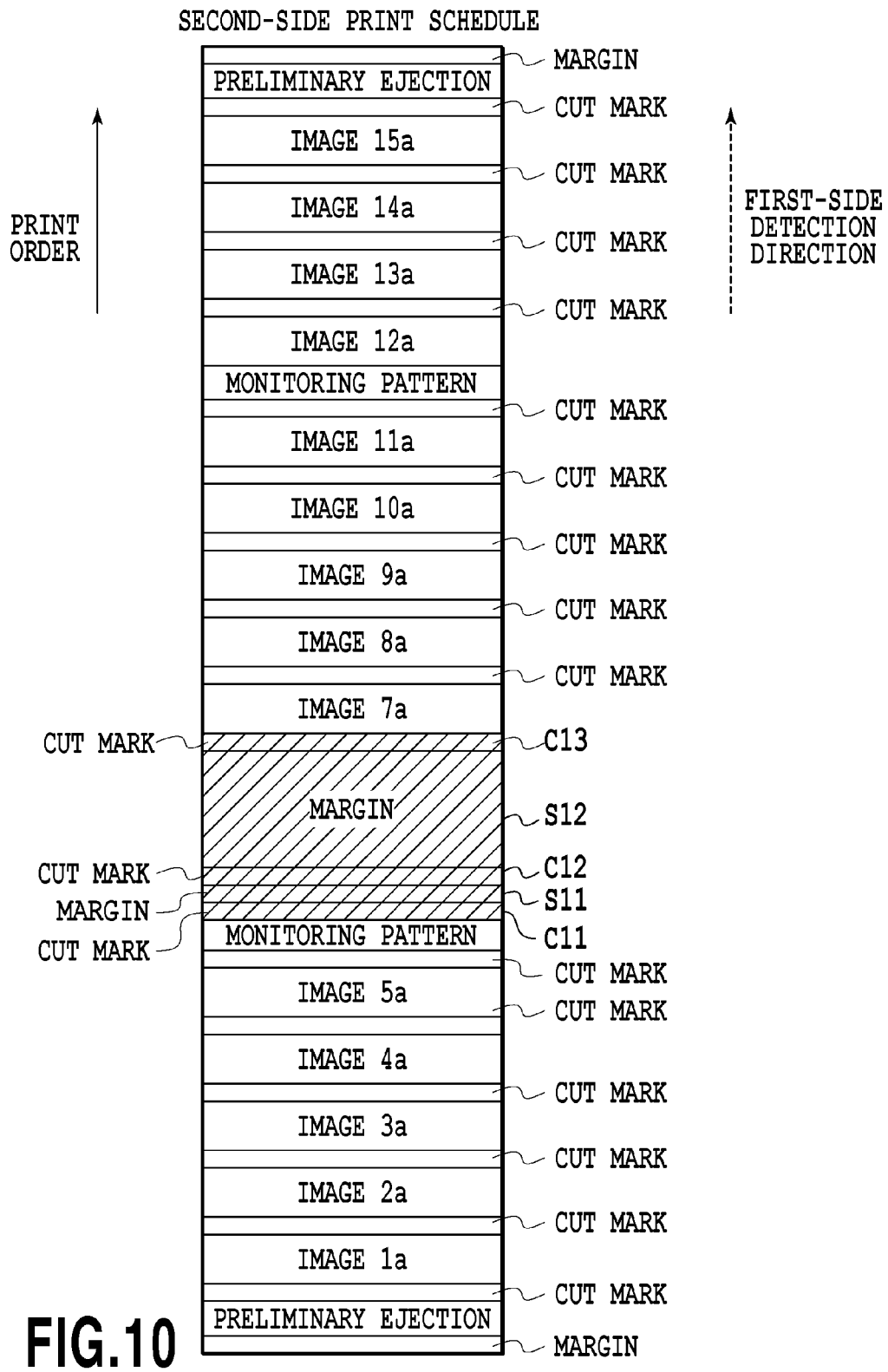
FIG. 10 is a diagram illustrating a second-side print schedule.

First, in step S31, a second-side print schedule is created. The second-side print schedule is associated with the first-side print schedule so that an image associated with an image to be printed on the first side is printed on the back surface side (second side) of the image on the first side. In this case, the second-side print schedule is created based on the result of the printing on the first side so as not to print an image in an area on the second side corresponding to a print disabled area. The print positions of the preliminary ejection, the ejection failure monitoring pattern, and the like are set as is the case with the first-side print schedule. For example, such a second-side print schedule as shown in FIG. 10 is created based on the result of printing of the first side in accordance with the first-side print schedule in FIG. 7. Images 1a, 2a, 2a, ... are printed on the back (second side) of the images 1, 2, 3, ... on the first side. An area on the second side which corresponds to the print disabled area LA is printed with a cut mark C11, a margin S11, a cut mark C12, a margin S12, and a cut mark C13. An image 6a to be printed on the back (second side) of the image 6 on the first side is not printed.

In the next step S32, the unit images and the maintenance patterns are sequentially printed on the continuous sheet in accordance with the created second-side print schedule. Step S33 determines whether or not printing in accordance with the second-side print schedule and cutting of the continuous sheet at the position of the cut mark have all been finished. If these operations are finished, the sequence ends. If the operations are not finished, the process shifts to step S34.

In step S34, the first side of the sheet is scanned by the scanner 5b in the check section 5 to determine whether or not the identification mark P has been detected. If the identification mark P has not been detected, then in step S35, the sheet is cut at a position corresponding to the cut mark printed on the second side.

On the other hand, if the identification mark P is detected, then in step S36, a schedule is set according to which the sheet is forcedly cut at a position following the next cut mark, and in the subsequent step S37, the sheet is forcedly cut. The forced cutting is an operation of continuously operating the cutter section 6 to cut the sheet into small pieces of the sheet and discharging the cut pieces of the sheet into the wastebasket 19.

The next step S38 determines whether or not the cut mark on the second side has been detected, and the forced cutting by the cutter section 6 is continued until the cut mark is detected. If the cut mark C11 on the second side is detected, the forced cutting is stopped, and in step S35, normal cutting is carried out. Then, the process returns to step S33 again. Thus, a margin S12 in FIG. 10 is continuously cut.

Thus, the content of the operation of the cutter section 6 is switched depending on the presence or absence of the identification mark P on the first side, to forcedly cut the print disabled area. This enables a further reduction in the burden of the operation of sorting out unwanted printed matter.

In the present example, the cutter section 6 is continuously operated to cut the sheet into small pieces and to discharge the pieces of the sheet into the wastebasket 19. However, the cutter section 6 may intermittently cut the sheet into a piece of a length sufficient to be discharged into the sorter section 11 and discharge the cut piece into a tray different from the tray for normal printed matter. Furthermore, in the present example, the operation from printing until cutting the sheet is performed within the single printing apparatus. However, the operation processes performed by the cutter section, the sorter section, and the like may be executed by different apparatuses.

The print schedule may be set by either of the printing apparatus and host apparatus forming a print system. Alternatively, the user may select one of a plurality of print schedules to be executed. The plurality of schedules may be, for example, a schedule according to which the print operation is immediately halted when the unique portion mark is detected and a schedule according to which the print operation is performed as usual even though the unique portion mark is detected. Furthermore, the schedule may involve a different print timing for the monitoring pattern or a different set of maintenance patterns. Moreover, the schedule may involve printing the interest image without halting the printing and applying an identification mark to the sheet indicating that the image is defective. Alternatively, by switching, based on instructions provided from the host apparatus 16 or control section 15 in the printing apparatus, the print schedule to be executed when the unique portion mark is detected, control can be performed according to the configuration of the printing apparatus or set conditions for the print operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-169227, filed Jul. 31, 2012, which is hereby incorporated by reference herein in its entirety.

What is claimed is:

1. A control method for printing images sequentially on a continuous sheet, the method comprising:
    printing a first image; and
    halting print processing of the first image in a case when a part of the first image has been printed on the continuous sheet and it is determined that a disabled area containing a unique portion unsuitable for printing that exists on the continuous sheet overlaps a trail end of an area for a part of the first image which has not yet been printed.

2. The method according to claim 1, further comprising printing an identification mark indicating that the first image overlaps the disabled area between the part of the first image and a cut mark.

3. The method according to claim 2, wherein the identification mark is detected by a detection section to recognize the first image as defective.

4. The method according to claim 1, wherein after a plurality of images are printed on a first side of the continuous sheet, a plurality of images are printed on a second side of the continuous sheet, and
    image printing in an area on the second side on the back of the disabled area is also avoided in a case where the disabled area is set on the first side.

5. The method according to claim 1, wherein a cutter section sequentially cuts the continuous sheet into a piece corresponding to each image, and the cutter section cuts off the first image and the disabled area.

6. The method according to claim 5, wherein the cutter section cuts the disabled area into a plurality of pieces of the sheet.

7. A printing apparatus comprising:
    a print unit configured to sequentially print a plurality of images on a continuous sheet, the plurality of images including a first image;
    a control unit configured to halt printing processing of the first image in a case when a part of the first image has been printed on the continuous sheet and it is determined that a disabled area containing a unique portion unsuitable for printing that exists on the continuous sheet overlaps a trail end of an area for a part of the first image which has not yet been printed.

8. The method according to claim 1, further comprising printing a cut mark indicating a position where the continuous sheet is cut between a printed part of the first image and a second image to be printed.

\* \* \* \* \*